United States Patent Office 3,405,340
Patented Oct. 8, 1968

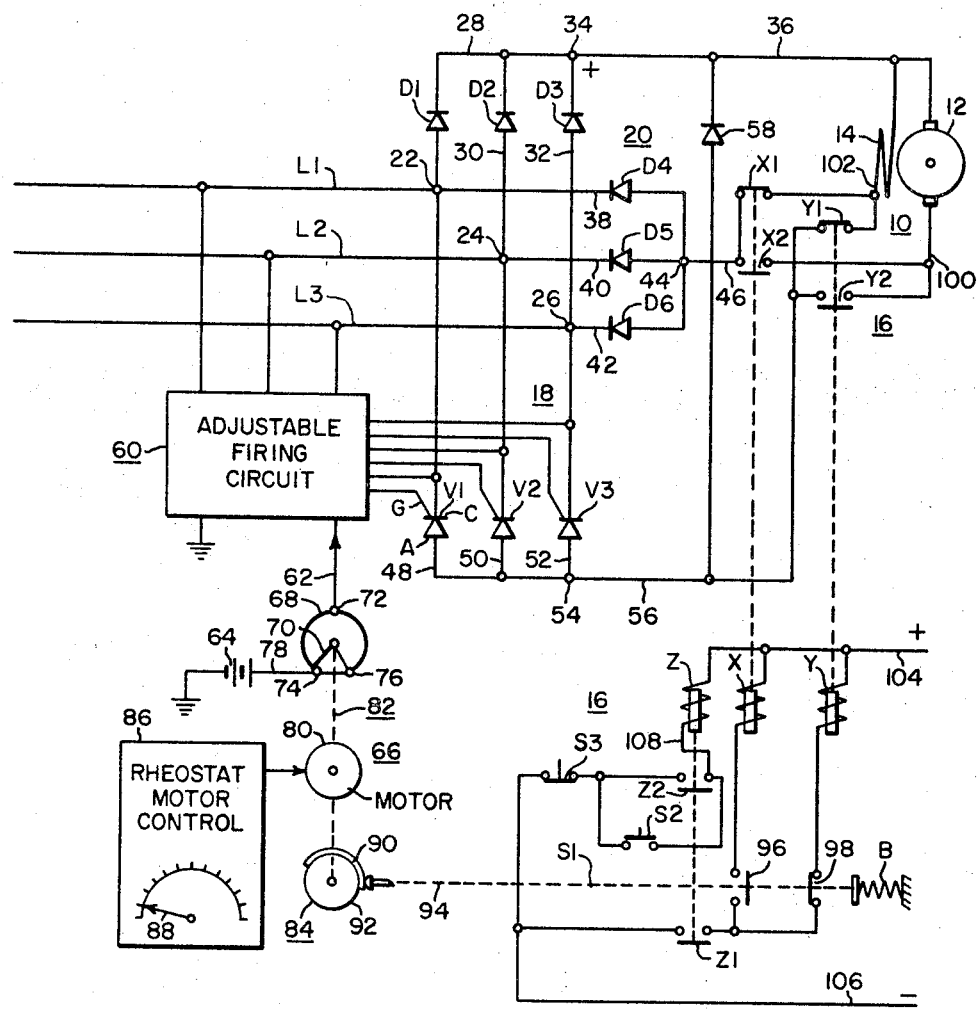

3,405,340
DC MOTOR POWER SUPPLY HAVING SINGLE CONTROL UNIT ALTERNATIVELY VARYING ARMATURE AND FIELD VOLTAGES
Earl B. Ankenman, Cincinnati, Ohio, and Stanley E. Morgan, Williamsville, N.Y., assignors to Westinghouse Electric Corporation, Pittsburgh, Pa., a corporation of Pennsylvania
Filed Feb. 28, 1966, Ser. No. 530,512
4 Claims. (Cl. 318—336)

This invention relates to power supply systems for DC motors.

An important object of this invention is to provide an adjustable control unit for varying the armature voltage at full field voltage until full armature voltage is applied (base speed) at which time the control unit is switched from the armature circuit to the field circuit and employed to vary the field voltage (field weakening control) at full armature voltage, thus covering the complete range of armature voltage and field voltage with a single control unit.

In accordance with one embodiment of the invention, first and second bridge type rectifiers having common asymmetric branches are connected to the armature and field windings through a transfer switch system actuated by a motor-operated rheostat as it crosses its midpoint. The motor-operated rheostat controls the first rectifier to vary its output voltage. This output voltage is a minimum when the rheostat is at either end of its traverse, and a maximum when the rheostat is at the midpoint of its traverse. The switch system in a first mode connects the first rectifier to the armature and the second rectifier to the field, and in a second mode, the switch system connects the first rectifier to the field and the second rectifier to the armature. With the switching system in the first mode, the field is at full voltage and the armature voltage is adjustable from zero to full voltage. When the rheostat crosses midpoint, the switch system switches to the second mode wherein the armature is at full voltage while the field voltage is adjustable from full to weakest field.

Other objects and advantages of the invention will become more apparent from the following detailed description taken in connection with the drawing wherein a diagram illustrates a preferred embodiment of the invention.

Shown in the figure is a DC motor 10 that is provided with an armature winding 12 and a field winding 14, each of which is alternatively connectable through a connection-reversing switch system 16 to one or the other of two DC supply sources 18 and 20, the armature and the field being connected to different ones of said sources at any given time. By way of example, sources 18 and 20 are shown as bridge type AC (alternating current) to DC (direct current) bridge type rectifiers. More specifically, rectifiers 18 and 20 are shown as three-phase bridge type AC to DC rectifiers having a common set of AC input terminals 22, 24 and 26 that receive AC for both rectifiers from a set of supply lines L1, L2 and L3 connected to a suitable source of alternating current, not shown.

Rectifier 20 includes three asymmetric branches 28, 30 and 32, each connected between a different one of the AC input terminals and a positive polarity output terminal 34 connected to a positive bus 36. Rectifier 20 also includes a second set of asymmetric branches 38, 40 and 42, each connected between a different one of the AC input terminals and a negative output terminal 44 connected to a negative bus 46. Branches 28, 30 and 32 are respectively provided with a first set of asymmetric devices D1, D2 and D3. In like manner, branches 38, 40 and 42 are provided with a second set of asymmetric devices D4, D5 and D6 respectively. The asymmetric devices D1–D6 may, for example, be semiconductor diodes. With respect to the AC input terminals 22, 24 and 26 the first set of diodes (D1 to D3) and the second set of diodes (D4 to D6) are oppositely poled, i.e., diodes D1 to D3 are poled to conduct current out of terminals 22 to 26, while diodes D4 to D6 are poled to conduct current into terminals 22 to 26. Terminals 34 and 44 constitute the output terminals of rectifier 20.

Asymmetric branches 28, 30 and 32 are also a part of rectifier 18, which further includes controllable asymmetric branches 48, 50 and 52, each connected between a different one of the AC input terminals and a negative output terminal 54 connected to a negative bus 56. Branches 48, 50 and 52 are provided with controllable asymmetric valves V1, V2 and V3, respectively, which may, for example, be semiconductor controlled rectifiers, a specific example of which is a silicon controlled rectifier. With respect to the AC input terminals 22 to 26, the controllable valves V1 and V3 and the diodes D1 to D3 are oppositely poled; that is, the valves V1 to V3 are poled to conduct current into the AC input terminals, while the diodes D1 to D3 are poled to conduct current out of the AC input terminals. Terminals 34 and 54 constitute the output terminals of rectifier 18. From the above description and the drawing it is readily apparent that asymmetric branches 28, 30 and 32 are common to both rectifiers 18 and 20.

A commutating or free-wheeling diode 58 is connected across lines 36 and 56 to accommodate the inductive loading.

Each of the controllable valves V1 to V3 is provided with a current inlet electrode A, a current electrode C, a main current path extending internally from the inlet electrode to the outlet electrode, and a control electrode G for controlling the current flow through the main current path. In semiconductor controlled rectifiers the inlet, outlet, and control electrodes are usually referred to as the anode, cathode and gate electrodes, respectively.

In order to adjust the output voltage of rectifier 18 from zero to maximum, the gate-cathode circuits of valves V1 to V2 are driven by a suitable firing (gating) circuit 60 which is adjustable to control the conduction times of the valves V1 to V3 to produce the desired output voltages. The valves V1 to V3 may, for example, be phase controlled by a suitable firing circuit 60 which will trigger into conduction each valve in correct sequence at selectable desired instants of time during the forward half-cycles of the AC voltage wave applied to the anode. Firing circuits of this type, which are adjustable in response to changes of input control signals to vary as desired the firing angle of the valves, are well known and need no explanation herein. By way of example, firing circuit 60 is shown as any suitable type that will vary the position of the firing pulses to retard or advance the firing angle of the respective valves in response to and depending on the value of a control signal being received on a control input line 62 connected to the control portion of the firing circuit 60.

Control power from a power source, for example a battery 64, is supplied to line 62 through a motor-operated rheostat 66, whose position determines the magnitude of the control signal applied to line 62.

The rheostat 66 is provided with a resistance element 68 tranversed by a contact arm 70. An intermediate tap 72 of the element 68 is connected to line 62. Opposite ends 74 and 76 of the element 68 are connected to the arm 70 and through a line 78 to the battery 64. The full traverse of arm 70 is from one end 74 of element 68 to the opposite end 76. With arm 70 at either of the opposite ends 74 and 76, the resistance between lines 62 and 78 will be a maximum, and the control signal applied to line 62 will be a minimum. For these conditions, the voltage output of rectifier 18 will be at minimum, for example, substantially zero. With the arm 70 at the mid-point 72, the resistance between lines 62 and 78 will be a minimum, and the control signal applied to line 62 a maximum, to drive the output of rectifier 18 to full or maximum voltage, for example, rated armature voltage of motor 10. At rated armature voltage and full field voltage, motor 10 operates at what is known as base speed. The valve of the output voltage of rectifier 20 is substantially the same as the maximum output voltage of rectifier 18. This is also the value of full motor field voltage in the disclosed example. It will be appreciated that as arm 70 is moved from either end 74 or 76 toward the center tap 72, the voltage output of rectifier 18 increases until arm 70 reaches tap 72 at which point the rectifier 18 output voltage is maximum. Movement of arm 70 from tap 72 toward either end 74 or 76 decreases the rectifier 18 voltage output.

The motor-operated rheostat 66 further includes a motor 80 coupled through suitable gearing to a shaft 82 that is keyed to both the arm 70 and a cam disc 84 to drive these elements in unison. Operation of motor 80 in either direction is controlled by any suitable control circuit 86 coupled to motor 80 and having, for example, a manual control knob 88 which may be manipulated to provide any degree of full traverse of the rheostat arm 70 in either direction between points 74 and 76. The rheostat motor control 86 may, for example, be such that when the control knob 88 is set at the desired speed, the control 88 will drive motor 80 at a controlled rate to accelerate motor 10 at a predetermined safe controlled rate. This type of control for a motor-operated rheostat is well known and needs no further description.

Cam disk 84 has a high peripheral segment 90 and a low peripheral segment 92, for selective engagement with a spring biased (spring B) push rod operating plunger 94 of a switch S1 having sets of contacts 96 and 98 which are operated from one to the other of their respective open and closed positions by the plunger 94. The arrangement is such that while the arm 70 is anywhere on the rheostat segment between 74 and 72, switch S1 is in a mode wherein contacts 98 are closed and contacts 96 are open. However, when arm 70 is between 72 and 76, switch S1 is in another mode wherein contacts 98 are open and contacts 96 are closed. Switch S1 forms part of switching system 16 as hereinafter described in detail.

For convenience of description, the full traverse of arm 70 may be divided into two sectors, a "low speed" sector and the left side of tap 72, and a "high speed" sector on the right side of tap 72. In like manner, the corresponding positions or modes of switch S1 may be referred to as "low speed" and "high speed" positions. Thus, in the "low speed" mode of switch S1, switch plunger 94 is in the position wherein contacts 96 are open and contacts 98 are closed. In the "high speed" mode of switch S1, plunger 94 is in the position wherein contacts 96 are closed and contacts 98 are open. As hereinbefore pointed out, arm 70 and switch S1 are synchronized for concurrence in their low speed positions, and concurrence in their high speed positions.

The upper ends of the armature 12 and field 14 are connected to the positive bus 36, which is common to both rectifiers 18 and 20. The lower end of armature 12 is connected to a line 100 that is selectively connectable by the transfer switch system 16 to either of the negative buses 46 and 56. In like manner, the lower end of field 14 is connected to a line 102 that is selectively connectable to either of the negative buses 46 and 56 by means of the selecting switch system 16. The switch system 16 is arranged to connect the respective lines 46 and 56 to the respective lines 100 and 102 in either one order or the reverse order. One order is line 46 to line 102 and line 56 to line 100, the other order being line 46 to line 100 and line 56 to line 102.

In addition to switch S1, switching system 16 includes a pair of relays X and Y alternatively energized by switch S1, depending on whether switch S1 is in the low speed mode or the high speed mode. Relay X is provided with normally closed contacts X1 and normally open contacts X2. Relay Y is provided with normally closed contacts Y1 and normally open contacts Y2.

Relays X and Y are provided with operating circuits energized from a pair of DC lines 104 and 106 connected to a suitable power source. A start and stop circuit 108 connected across lines 104 and 106 includes in series the normally closed contacts OL, the operating coil of a relay Z, a normally open (momentary contact) start switch S2, and a normally closed stop switch S3. Relay Z is provided with normally open sets of contacts Z1 and Z2, all of which are closed when relay Z is energized by momentarily closing switch S2. Contacts Z2, when closed, latch the relay Z in energized position.

The operating circuit for relay X is connected across lines 104 and 106, and includes in series normally open contacts Z1, contacts 96 and the operating coil of relay X. When either of contact sets 96 or Z1 is open, relay X is unoperated. In this mode of relay X, contacts X1 are closed and contacts X2 are open. However, when contacts 96 and Z1 are closed, relay X is energized to open contacts X1 and close contacts X2.

The operating circuit for relay Y is connected across lines 104 and 106 and includes in series normally open contacts Z1, contacts 98 and the operating coil for relay Y. When either of contact sets Z1 or 98 is open, relay Y is unoperated and contacts Y1 are closed while contacts Y2 are open. On the other hand, when contacts Z1 and 98 are closed, relay Y is operated and contacts Y1 are open while contacts Y2 are closed.

From the above description of the switch system 16 it should be apparent that only one of the contactors X and Y is energized at any given time, their normal operation being one energized while the other is unenergized and vice versa, depending on whether switch S1 is in the low speed mode or the high speed mode. More specifically, with contacts Z1 closed and switch S1 in the low speed mode, contacts X1 and Y2 will be closed, and contacts X2 and Y1 will be open. On the other hand, when switch S1 is in the high speed mode, contacts X1 and Y2 will be open while contacts X2 and Y1 will be closed.

Contacts X1 are connected between lines 46 and 102 to effect a connection therebetween when switch S1 is in the low speed mode. Contacts X2 are connected between lines 46 and 100 to complete a connection therebetween when switch S1 is in the high speed mode. Contacts Y1 are connected between lines 56 and 102 to complete a connection therebetween when switch S1 is in the high speed mode. Contacts Y2 are connected between lines 56 and 100 to effect a connection therebetween when switch S1 is in the low speed mode. Thus, for the low speed mode, rectifier 20 is connected to field 14 while rectifier 18 is connected to the armature 12. On the other hand, in the high speed mode, rectifier 20 is connected to the armature 12 while rectifier 18 is connected to the field 14.

The maximum or full output voltage of rectifier 18 is substantially the same as the output voltage of rectifier 20. The system is arranged so that full output voltage of rectifier 18 (arm 70 at tap 72) is the full rated armature voltage of the motor 10.

Operation of the system may be explained as follows. Assume that the conditions shown in the drawing wherein relay Z is unoperated and rheostat arm 70 is set at the left end 74 of the rheostat. Switch S1 will be in the low speed mode with its contacts as shown. Contactors X and Y will be unenergized and their respective sets of contacts will be as shown in their normal positions. Now let it be assumed that switch S2 is closed to operate relay Z to close contacts Z1 and Z2. As a result, contactor Y will be energized to connect line 56 (rectifier 18) to the armature 12. Since arm 70 is at 74, the control signal on line 62 to the firing circuit will be minimum and the output of rectifier 18 will be zero. However, the output of rectifier 20 will be at full output voltage. Since contactor X is unaffected, line 46 (rectifier 20) remains connected to the field 14. With the switching system 16 in this mode, the output of rectifier 20 will be connected across the field 14 while the output of rectifier 18 will be connected across the armature 12. At this time, rectifier 20 will apply full rated field voltage across the field 14. However, since the rheostat arm 70 is at 74, the rectifier 18 output is zero and the armature 12 will be unenergized.

Now let it be assumed that, in response to manipulation of control knob 88, arm 70 is moved away from 74 in the clockwise direction to apply firing pulses to valves V1 to V3. As a result, rectifier 18 will supply voltage to armature 12, which voltage will increase as the arm 70 is moved toward tap 72, reaching a maximum value (rated armature voltage) when arm 70 reaches tap 72. With the application of voltage across the armature 12, the armature will rotate at a speed dependent upon the magnitude of the armature supply voltage. As the arm 70 is moved toward tap 72, the speed of the motor is increased. With the arm 70 at any position to the left of tap 72 (low speed sector), rectifier 18 is at less than full output, contactor X remains unenergized, and contactor Y is energized. As the arm 70 is moved clockwise, the firing angle of the valves V1 to V3 is advanced (reduced) which, of course, increases the conduction angle (period) of the valves and also increases the voltage supply to the motor armature. With continued clockwise movement of the arm 70, the applied armature voltage and motor speed keep increasing until arm 70 reaches the midpoint 72, which results in maximum conduction angle for the valves V1 to V3 and full output for rectifier 18. At this point, plunger 94 is spring pressed from the high segment 90 to the lower segment 92 of cam disk 84, thus to close contacts 96 and open contacts 98. As a result, contactor Y is deenergized and contactor X is energized. These actions open contacts X1, Y2 and close contacts X2 and Y1. The net result is that the connections between lines 46 and 56 on the one hand and lines 102 and 100 on the other hand are reversed to connect line 46 to line 100 and line 56 to line 102. This transfers the output of rectifier 20 from the field to the armature, and the output of rectifier 18 from the armature to the field. This transfer can be safely made, even at closed circuit, since the output voltages of the rectifiers 20 and 18 are approximately equal and the motor field is operating above the knee of the saturation curve.

With this transfer in effect, continued clockwise movement of arm 70 in the high speed sector from tap 72 toward the right end 76 of the rheostat will decrease the control signal on line 62 to the firing circuit 60, and thereby reduce the output voltage of rectifier 18. This weakens the motor field and increases the speed of motor 10 above base speed. With arm 70 at point 76, the output of rectifier 18 is minimum providing weakest field and highest speed for motor 10.

Moving arm 70 counterclockwise from point 76 toward tap 72 will increase the field voltage and decrease the speed of motor 10. Upon continued clockwise movement of arm 70, motor 10 will drop to base speed when arm 70 reaches tap 72. Continued counterclockwise movement of arm 70 will cause it to cross tap 72, at which point the high segment 90 of the cam disk 84 will force the plunger 94 to the right against its bias spring B, thus to operate switch S1 to its low speed mode, wherein contacts 96 open and contacts 98 close. As a result, the switch system 16 reverses the connections of lines 46 and 56 to lines 102 and 100, thus switching rectifier 18 from the field to the armature, and rectifier 20 from the armature to the field. Continued counterclockwise movement of arm 70 in the low speed sector from tap 72 to point 74 will decrease the armature voltage and the speed of motor 10.

If desired, the shaft 82 which turns arm 70 and cam disk 84 may be directly rotated manually to any desired setting, if done so at a rate which will allow the armature voltage to be established at rated value before the rectifiers 18 and 20 are cross switched between field and armature.

From the description herein, it should be apparent that the present invention provides simple and unique apparatus wherein a single control unit is switched from one to the other of field and armature at the crossover or base speed point, thus providing full range of speed control requiring only one control unit.

It should be understood that the herein described arrangements are simply illustrative of the principles of the invention, and that other embodiments and applications are within the spirit and scope of the invention.

What is claimed is:

1. Apparatus for controlling a DC motor having respective field and armature windings, said apparatus comprising a controllable first AC to DC rectifier having a first DC output circuit, a second AC to DC rectifier having a second DC output circuit, switch means selectively operable in first and second modes, said switch means being connected to said first and second DC output circuits and to said armature and field windings, said switch means in the first mode connecting the first DC output circuit to the armature winding and the second DC output circuit to the field winding, said switch means in the second mode connecting the first DC output circuit to the field winding and the second DC output circuit to the armature winding.

2. The combination as in claim 1, wherein both rectifiers are bridge type rectifiers having common AC input terminals and a common set of asymmetric branches.

3. The combination as in claim 1, wherein said first rectifier comprises first and second DC output terminals of opposite polarity, a plurality of AC input terminals, a first set of asymmetric branches each connecting a different one of said AC input terminals to the first DC output terminal, a second set of asymmetric branches each connecting a different one of said AC input terminals to the second DC output terminal, the asymmetric branches of said second set being controllable, said first and second sets of branches being oppositely poled relative to said AC input terminals, and wherein said second rectifier comprises said first DC output terminal, a third DC output terminal, and a third set of asymmetric branches each connecting a different one of said AC input terminals to said third DC output terminal, said first and third DC output terminals being of opposite polarity, said first and third sets of asymmetric branches being oppositely poled relative to said AC input terminals, said first set of branches being common to both rectifiers, the output circuit of said first rectifier including said first and second DC output terminals, the output circuit of said second rectifier including said first and third DC output terminals.

4. The combination as in claim 1 which further includes control means for controlling the magnitude of the output voltage of the first rectifier, said control means having a control element movable between first and second limits through an intermediate point, the output voltage of said first rectifier being gradually adjustable from minimum to maximum in response to movement of said control element from either of said first and second limits to said intermediate point and from maximum to minimum in response to movement of said control element from said intermediate point to either of said first and second limits, and means coupled to said control element and to said switch means for operating said switch means in its first mode when the control element is on one side of said intermediate point and in its second mode when the control element is on the other side of said intermediate point.

References Cited

UNITED STATES PATENTS

| | | | |
|---|---|---|---|
| 3,181,050 | 4/1965 | Berman | 318—356 X |
| 3,205,396 | 9/1965 | King | 318—405 X |

ORIS L. RADER, *Primary Examiner.*

J. BAKER, *Assistant Examiner.*